(12) United States Patent
Vrabete

(10) Patent No.: US 12,133,150 B2
(45) Date of Patent: Oct. 29, 2024

(54) TECHNOLOGIES FOR ADAPTIVE BANDWIDTH REDUCTION

(71) Applicant: Intel Corporation, Santa Clara, CA (US)

(72) Inventor: Brad Vrabete, Sixmilebridge (IE)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 14/998,270

(22) Filed: Dec. 26, 2015

(65) Prior Publication Data

US 2017/0188178 A1    Jun. 29, 2017

(51) Int. Cl.
*H04W 4/70* (2018.01)
*G08C 17/02* (2006.01)
*H04L 67/1097* (2022.01)
*H04L 67/125* (2022.01)

(52) U.S. Cl.
CPC .............. *H04W 4/70* (2018.02); *G08C 17/02* (2013.01); *H04L 67/1097* (2013.01); *H04L 67/125* (2013.01)

(58) Field of Classification Search
CPC .......... G06F 17/10; G06F 17/11; G06F 17/17; H04W 4/70; H04W 84/18; G08C 17/02; H04L 67/125; H04L 67/1097; H04L 41/06; H04L 41/0627; H04L 41/0681; H04L 43/022–024; H04L 43/02; H04L 43/08; H04L 43/0817; H04L 43/16; G16Y 40/10; G16Y 40/20; G16Y 20/10–40
See application file for complete search history.

(56) References Cited

U.S. PATENT DOCUMENTS

| | | | |
|---|---|---|---|
| 2003/0043741 A1* | 3/2003 | Mukai | H04L 47/10 370/229 |
| 2006/0122525 A1 | 6/2006 | Shusterman | |
| 2007/0118301 A1* | 5/2007 | Andarawis | G01M 5/00 702/33 |

(Continued)

FOREIGN PATENT DOCUMENTS

| | | |
|---|---|---|
| KR | 10-2011-0067416 | 6/2011 |
| KR | 10-2011-0071150 | 6/2011 |
| WO | 2015-179499 | 11/2015 |

OTHER PUBLICATIONS

Ryan LaMothe, "Edge Computing," Jan. 2013.*

(Continued)

*Primary Examiner* — Shaun M Campbell
*Assistant Examiner* — Aneta B Cieslewicz
(74) *Attorney, Agent, or Firm* — HANLEY, FLIGHT & ZIMMERMAN, LLC

(57) ABSTRACT

Technologies for adaptive bandwidth reduction for an Internet of Things (IoT) gateway device are disclosed. The IoT gateway device receives data from one or more sensors, and determines a mathematical model to represent the sensor data. Certain aspects of the mathematical model used, such as the quantity of coefficients and the precision of the coefficients are determined based on the sensor data. For example, if the sensor data is within a normal range, a relatively small number of coefficients might be used, but if the sensor data is past or near an alert threshold, a larger number of coefficients might be used, which allows for the behavior of the sensor data to be better represented.

26 Claims, 4 Drawing Sheets

(56) References Cited

U.S. PATENT DOCUMENTS

| | | | |
|---|---|---|---|
| 2012/0273581 A1 | 11/2012 | Kolk et al. | |
| 2015/0381737 A1* | 12/2015 | Quinn | H04L 67/12 709/217 |
| 2017/0060574 A1* | 3/2017 | Malladi | G06F 8/70 |
| 2017/0094592 A1* | 3/2017 | Tabatabaei | H04W 48/16 |
| 2017/0123073 A1* | 5/2017 | Jakupi | G01S 19/26 |

OTHER PUBLICATIONS

O'Harver, T. "Curve fitting A: Linear Least Squares", Oct. 15, 2008. https://web.archive.org/web/20081210125209/https://terpconnect.umd.edu/~toh/spectrum/CurveFitting.html (Year: 2008).*

Ozdemir et al., "Polynomial Regression Based Secure Data Aggregation for Wireless Sensor Networks", 2011 IEEE Global Telecommunications Conference, GLOBECOM 2011 (Year: 2011).*

International search report for PCT application No. PCT/US2016/063585, dated Mar. 8, 2017 (3 pages).

Written opinion for PCT application No. PCT/US2016/063585, dated Mar. 8, 2017 (7 pages).

\* cited by examiner

TECHNOLOGIES FOR ADAPTIVE BANDWIDTH REDUCTION

BACKGROUND

Many types of devices, such as sensors, vehicles, appliances, industrial equipment, and other things, are gaining computing resources and network capability. Sometimes described as the Internet of Things (IoT), modern computing systems may include cloud-based servers, network infrastructure, and connected edge devices that all work together to perform networked application functions. Typical IoT connected edge devices may be small devices, such as sensor devices, with low power consumption and thus typically include relatively low processing power or other computing resources. Additionally, typical IoT connected devices at the edges of the network may have limited available bandwidth.

A typical IoT device may generate a large amount of data that indicates the device is functioning within normal limits, and in such cases the data is often discarded instead of being transmitted to a cloud-based server in order to limit bandwidth used.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
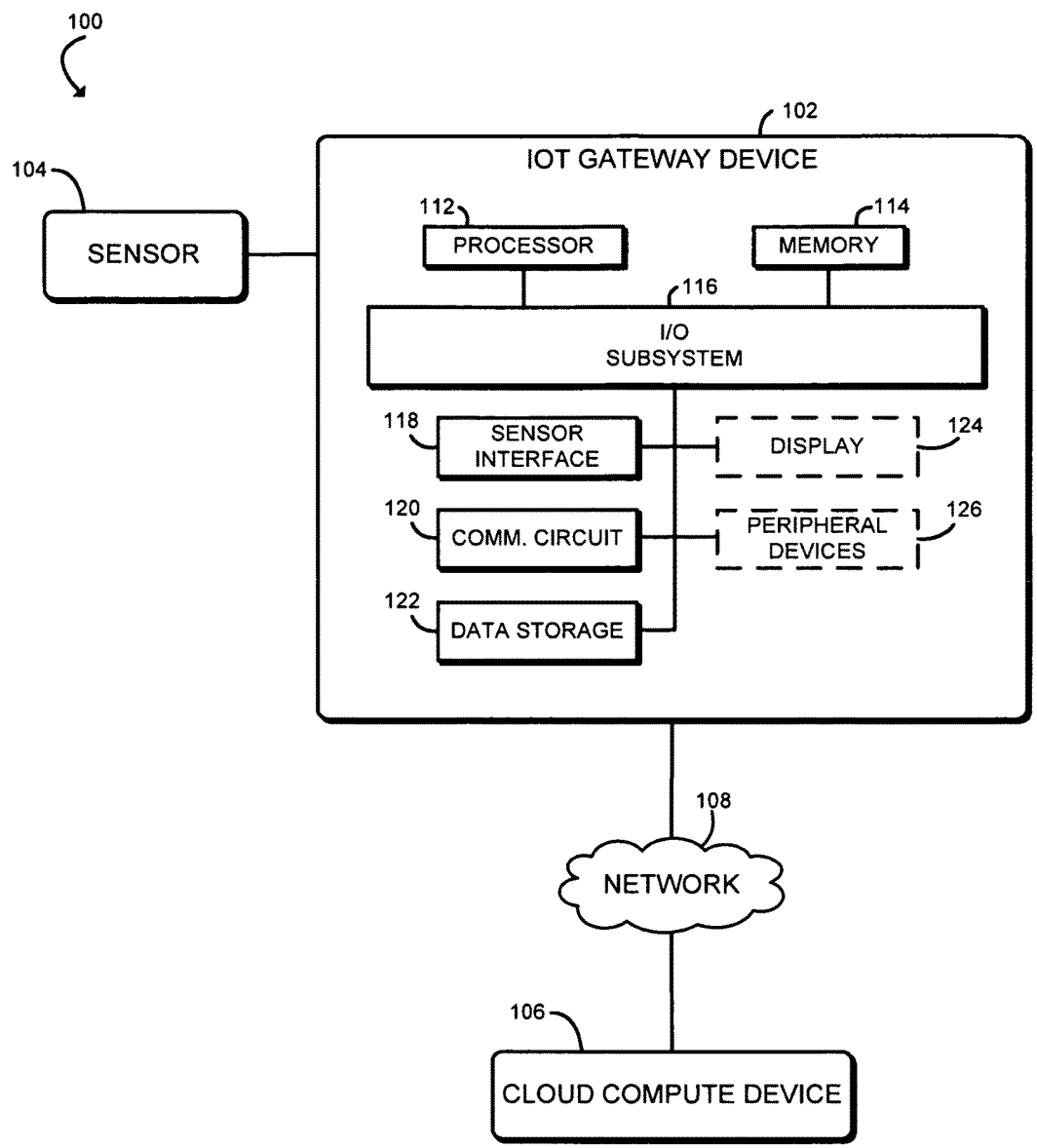
FIG. 1 is a simplified block diagram of at least one embodiment of a system for adaptive bandwidth reduction.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for adaptive bandwidth reduction includes an Internet of Things (IoT) gateway device 102, one or more sensors 104, a cloud compute device 106, and a network 108 over which the IoT gateway device 102 and the cloud compute device 106 can communicate. In the illustrative embodiment, in use and as described in more detail below, the IoT gateway device 102 captures sensor data from the sensor(s) 104 over a period of time (e.g., sampling a voltage of the sensor 104). The IoT gateway device 102 analyzes the captured sensor data and determines a trend of the sensor data (e.g., a trend of a voltage relative to an alarm threshold). The IoT gateway device 102 subsequently determines a mathematical model based on the determined trend. If, for example, the trend indicates that the sensor data is approaching a defined threshold, the IOT gateway device 102 may determine to represent the data using a mathematical model that better follows or defines the trend (e.g., by using a mathematical model having more coefficients and/or coefficients with more precision in order to model the data with more detail). If, on the other hand, the trend is that the sensor data is stable at the desired level, the IoT gateway device 102 may choose to represent the data using a different mathematical model, such a non-bandwidth-intensive model (e.g., by using a mathematical model having fewer coefficients and/or coefficients with less precision in order to conserve bandwidth). The IoT gateway device 102 communicates the values of the coefficients and/or other parameters of the determined mathematical model to the cloud compute device 106 over the network 108.

The sensor 104 may be embodied as any type of sensor capable of generating sensor data indicative of an event, a status, or a change of its environment, such as a temperature sensor, a pressure sensor, a flow sensor, a force sensor, a light sensor, etc. In some embodiments, the sensor 104 may be a passive device, such as a thermistor, that is able to be probed by the IoT gateway device 102. In other embodiments, the sensor 104 may be an active device that may be capable of performing simple or complex processing on the sensor data before sending the sensor data to the IoT gateway device 102. Some embodiments may incorporate aspects of both a passive device and an active device into the sensor 104. Of course, in some embodiments as discussed above, there may be more than one sensor 104, which is not shown in FIG. 1 for the sake of clarity.

The IoT gateway device 102 may be embodied as any type of compute device capable of performing the functions described herein. For example, the IoT gateway device 102 may be embodied as or otherwise be included in, without limitation, a gateway, an embedded computing system, a System-on-a-Chip (SoC), a desktop computer, a server computer, a smartphone, a cellular phone, a tablet computer, a notebook computer, a laptop computer, a wearable computer, a handset, a messaging device, a camera device, a multiprocessor system, a processor-based system, a consumer electronic device, and/or any other compute device.

The illustrative IoT gateway device 102 includes a processor 112, a memory 114, an input/output (I/O) subsystem 116, a sensor interface 118, a communication circuit 120, and data storage 122. In some embodiments, one or more of the illustrative components of the IoT gateway device 102 may be incorporated in, or otherwise form a portion of, another component. For example, the memory 114, or portions thereof, may be incorporated in the processor 112 in some embodiments.

The processor 112 may be embodied as any type of processor capable of performing the functions described herein. For example, the processor 112 may be embodied as a single or multi-core processor(s), a single or multi-socket processor, a digital signal processor, a microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the IoT gateway device 102 such as operating systems, applications, programs, libraries, and drivers. The memory 114 is communicatively coupled to the processor 112 via the I/O subsystem 116, which may be embodied as circuitry and/or components to facilitate input/output operations with the processor 112, the memory 114, and other components of the IoT gateway device 102. For example, the I/O subsystem 116 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 116 may form a portion of a system-on-a-chip (SoC) and be incorporated, along with the processor 112, the memory 114, and other components of the IoT gateway device 102 on a single integrated circuit chip.

The sensor interface 118 may be embodied as any type of interface, connection, or device capable of acquiring sensor data from the sensor 104. For example, the sensor interface 118 may be embodied as an analog-to-digital converter (ADC), a voltage sensor, a current sensor, a resistance sensor, a serial connection such as RS-232, a universal serial bus (USB) connection, or a device capable of wireless communication such as an antenna. In some embodiments, the sensor interface 118 may implement a protocol similar to that described below in regard to the communication circuit 120, or the sensor interface 118 may form a portion of or otherwise be integrated with the communication circuit 120.

The communication circuit 120 may be embodied as any type of communication circuit, device, or collection thereof, capable of enabling communications between the IoT gateway device 102 and the cloud compute device 106 and/or other devices. To do so, the communication circuit 120 may be configured to use any one or more communication technology and associated protocols (e.g., Ethernet, Bluetooth®, Wi-Fi®, WiMAX, near field communication (NFC), etc.) to effect such communication.

The data storage 122 may be embodied as any type of device or devices configured for the short-term or long-term storage of data. For example, the data storage 122 may include any one or more memory devices and circuits, memory cards, hard disk drives, solid-state drives, or other data storage devices.

Of course, in some embodiments, the IoT gateway device 102 may include other or additional components, such as those commonly found in a compute device. For example, the IoT gateway device 102 may also have a display 124 and/or peripheral devices 126 such as a keyboard, mouse, camera, speaker, etc. The display 124 may be embodied as any type of display on which information may be displayed to a user of the IoT gateway device 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

The cloud compute device 106 may be embodied as any type of compute device or system of compute devices capable of communicating with the IoT gateway device 102 and performing the functions described herein. For example, in some embodiments, the cloud compute device 106 may be embodied as a server, rack-mounted server, blade server, desktop computer, laptop computer, tablet computer, notebook, netbook, Ultrabook™, cellular phone, smartphone, personal digital assistant, mobile Internet device, wearable computing device, hybrid device, and/or any other computing/communication device. The cloud compute device 106 may include components similar to those of the IoT gateway device 102 discussed above, such as a processor, memory, and I/O subsystem. The description of those components of the IoT gateway device 102 is equally applicable to the description of components of the cloud compute device 106 and is not repeated herein for clarity of the description. Further, it should be appreciated that the cloud compute device 106 may include other components, sub-components, and devices commonly found in a computing system, which are not discussed above for clarity of the description. In some embodiments, one or more of the components of the IoT gateway device 102 may be omitted from the cloud compute device 106.

The network 108 may be embodied as any type of communication network capable of facilitating communication between the IoT gateway device 102 and the cloud compute device 106. The network 108 may be embodied as or otherwise include Ethernet, Bluetooth®, Wi-Fi®, WiMAX, near field communication (NFC), cellular communication, analog communication, etc. Additionally or alternatively, the IoT gateway device 102 may communicate directly with the cloud compute device 106, without using a network of any kind.

Figure 2:
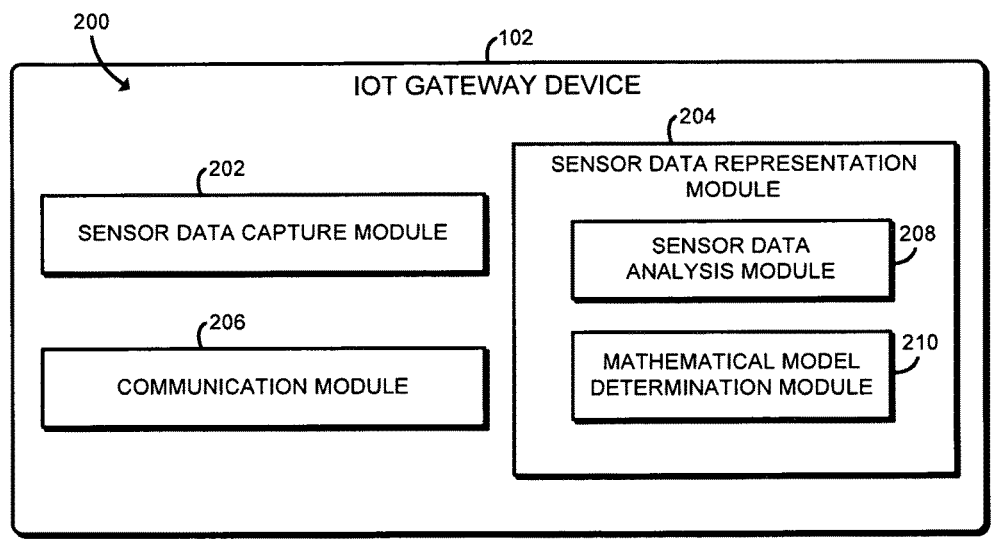
FIG. 2 is a block diagram of at least one embodiment of an environment that may be established by an IoT gateway device of FIG. 1.

Referring now to FIG. 2, in use, the IoT gateway device 102 may establish an environment 200. The illustrative environment 200 includes a sensor data capture module 202, a sensor data representation module 204, and a communication module 206. The various modules of the environment 200 may be embodied as hardware, software, firmware, or a combination thereof. For example, the various modules, logic, and other components of the environment 200 may form a portion of, or otherwise be established by, the processor 112 or other hardware components of the IoT gateway device 102. As such, in some embodiments, one or more of the modules of the environment 200 may be embodied as circuitry or collection of electrical devices (e.g., a sensor data capture circuit 202, a sensor data representation circuit 204, a communication circuit 206, etc.). It should be appreciated that, in such embodiments, one or more of the circuits (e.g., the sensor data capture circuit 202, the sensor data representation circuit 204, the communication circuit 206, etc.) may form a portion of one or more of the processor 112, the memory 114, the I/O subsystem 116, and/or the data storage 122. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 112 or other components of the IoT gateway device 102.

The illustrative sensor data capture module 202, which may be embodied as hardware, firmware, software, virtualized hardware, emulated architecture, and/or a combination thereof as discussed above, is configured to receive sensor data from the sensor 104. The sensor data capture module 202 may receive sensor data continuously, continually, or periodically. In some embodiments, the sensor data capture module 202 receives sensor data that is sent by the sensor 104. Additionally or alternatively, the sensor data capture module 202 may receive sensor data by probing or polling the sensor 104, such as by sampling a voltage.

The illustrative sensor data representation module 204, which may be embodied as hardware, firmware, software, virtualized hardware, emulated architecture, and/or a combination thereof as discussed above, is configured to represent the sensor data using a mathematical model. The sensor data representation module 204 includes a sensor data analysis module 208 and a mathematical model determination module 210. The sensor data analysis module 208 is configured to analyze the sensor data by, for example, determining a trend of the sensor data or comparing the sensor data to one or more alert thresholds.

The mathematical model determination module 210, which may be embodied as hardware, firmware, software, virtualized hardware, emulated architecture, and/or a combination thereof as discussed above, is configured to determine a mathematical model to represent the sensor data. As discussed in more detail below in regard to FIG. 3, the illustrative mathematical model determination module 210 determines one or more parameters for the mathematical model, and also determines values for the coefficients of the model.

It should be appreciated that each of the sensor data analysis module 208 and the mathematical model determination module 210 of the sensor data representation module 204 may be separately embodied as hardware, firmware, software, virtualized hardware, emulated architecture, and/or a combination thereof. For example, the sensor data analysis module 208 may be embodied as a hardware component, while the mathematical model determination module 210 is embodied as a virtualized hardware component or as some other combination of hardware, firmware, software, virtualized hardware, emulated architecture, and/or a combination thereof.

The communication module 206 is configured to communicate with the cloud compute device 106. In the illustrative embodiment, the communication module 206 sends the parameters and coefficients of the mathematical model to the cloud compute device 106 each time the parameters and coefficients are determined. In some embodiments, the communication module 206 may not send the parameters and coefficients each time they are determined. Additionally or alternatively, the communication module 206 may send additional data to the cloud compute device 106, such as the sensor data itself.

Figure 3A:
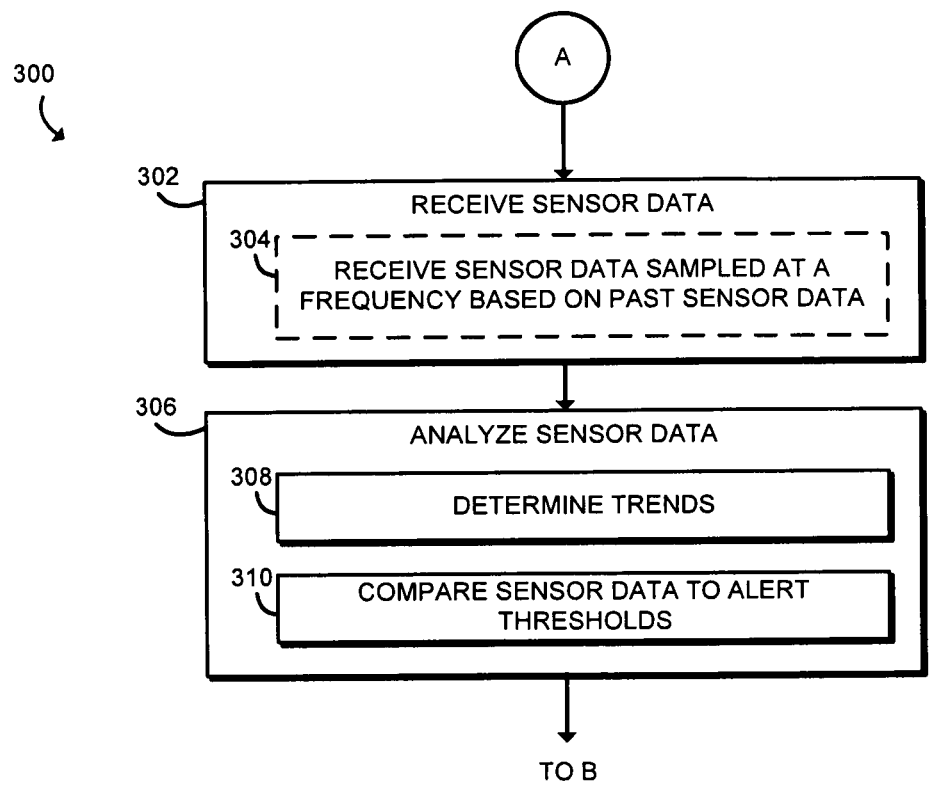
FIGS. 3A-3B is a simplified flow diagram of at least one embodiment of a method for adaptive bandwidth reduction that may be executed by the IoT gateway device of FIG. 1.
Figure 3B:
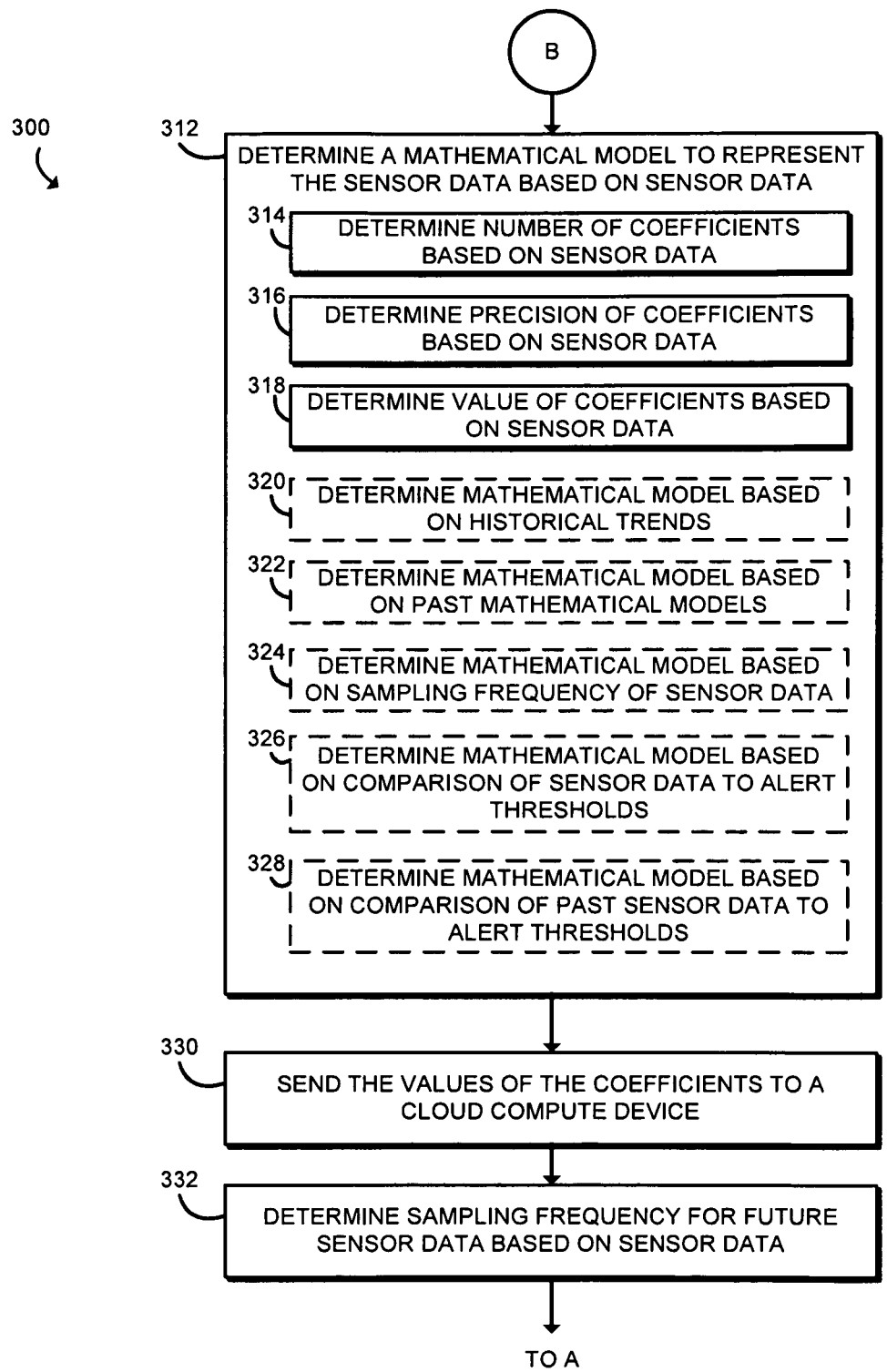

Referring now to FIG. 3A, in use, the IoT gateway device 102 may execute a method 300 for adaptive bandwidth reduction. The method 300 begins with block 302 in which the IoT gateway device 102 receives sensor data from the sensor 104. As described above, the IoT gateway device 102 may receive sensor data that is transmitted by the sensor 104 or may receive sensor data by sampling the sensor 104. In the illustrative embodiment, the sensor data includes a number of data points, each of which has a value and a corresponding time the value was determined. For example, the sensor data may include several values of a voltage sensor at several discrete time points. Depending on the embodiments, the IoT gateway device 102 may receive a relatively small number of data points before continuing (e.g., 2, less than 10, less than 100, etc.), or a relatively large number of data points before continuing (e.g., more or less than 100, 1,000, 10,000, etc.). In some embodiments, the IoT gateway device 102 may receive sensor data in block 304 that is sampled at a frequency that is based on past sensor data, as described in more detail in block 332 of FIG. 3B.

In block 306, the IoT gateway device 102 may analyze the sensor data. In block 308, the IoT gateway device 102 determines one or more trends of the data, such as if it is remaining relatively constant, increasing, decreasing, etc. In block 310, the IoT gateway device 102 compares the sensor data to one or more alert thresholds. In the illustrative embodiment, the one or more alert thresholds are predetermined by the IoT gateway device 102. When a value of a sensor 104 is past the alert threshold, an alert may be generated. For example, being past an alert threshold may indicate that the sensor value is too high or too low. Depending on the embodiment and the alert, a value of a sensor being past an alert threshold may mean that the value is higher than the threshold or lower than the threshold. In some embodiments, the conditions for being past an alert threshold may be more detailed than simply being past a value. For example, an alert threshold may specify that the sensor value be past the threshold for a certain period of time in order to trigger the alert. Of course, comparing the sensor data to an alert threshold may include analysis in addition to a simple comparison of the sensor value to the alert threshold, such as determining how close the sensor value is to the threshold, how much closer it got during the period in question, how long it was close to the threshold, etc. The method 300 subsequently proceeds to block 312 in FIG. 3B.

In block 312, the IoT gateway device 102 determines a mathematical model to represent the sensor data based on the sensor data. To do so, in some embodiments, the IoT gateway device 102 may select a new mathematical model that best represents the sensor data trend, such as a polynomial fit, a fit using several different frequencies (i.e., in a manner similar to a Fourier-related transform), etc., and/or new parameters of a mathematical model presently used to represent the sensor data. Of course, in embodiments in which a new mathematical model is selected, parameters of the new mathematical model may also be determined in block 312. The parameters of the mathematical model may include any characteristics of the mathematical model that are selected to adjust the behavior of the mathematical model so as to better fit the sensor data trend. For example, in the illustrative embodiment, the parameters of the mathematical model may include the number of coefficients (i.e., how many coefficients are used) and the precision of the coefficients. A coefficient of the mathematical model may be embodied as a variable that indicates a magnitude of a certain term of the model, such as the magnitude of a linear term, a quadratic term, etc. The precision of the coefficients may define how precisely the values of the coefficients are represented (e.g., how many bits to be used to represent the values).

As such, in block 314, the IoT gateway device 102 determines the number of coefficients to be used by the mathematical model. Additionally, in block 316, the IoT gateway device 102 determines the precision of the coefficients. In some embodiments, one or both of the number of coefficients or the precision of the coefficients may be pre-determined or otherwise not determined based on the sensor data.

In block 318, the IoT gateway device 102 determines values for the coefficients of the mathematical model. How the values are determined may depend on the type of mathematical model. For example, if the model is a polynomial fit, the IoT gateway device 102 may determine the value of the constant term, the linear term, the quadratic term, etc., based on the sensor data.

In determining the type of mathematical model and its parameters, the IoT gateway device 102 may consider several different additional factors, including but not limited to some or all of the examples included herein. For example, in block 320, the IoT gateway device 102 may determine the mathematical model based on historical trends of the data, such as trends determined on past sensor data similarly to that determined in step 308.

The IoT gateway device 102 may determine the mathematical model based on past mathematical models in block 322. For example, if the preceding mathematical model used a certain quantity of coefficients, the IoT gateway device 102 may determine that the current mathematical model should have at least a certain fraction of that quantity, such as half of the quantity.

Additionally or alternatively, the IoT gateway device 102 may determine the mathematical model based on the sampling frequency of the sensor data in block 324. For example, the sensor data may be been sampled at a frequency determined based on past sensor data, as shown in block 304. The IoT gateway device 102 may, for example, determine to use a higher quantity of coefficients if the sampling frequency of sensor data is high.

The IoT gateway device 102 may determine in block 326 the mathematical model based on the comparison of the sensor data to the alert thresholds done in block 310. For example, if the comparison indicates that the alert threshold has been passed or is close to being passed, the IoT gateway device 102 may determine that the quantity or precision of the coefficients should be increased. In some embodiments, the IoT gateway device 102 may determine the quantity and/or precision of the coefficients based on how close the sensor data is to the alert threshold, e.g. by determining the quantity and/or precision of the coefficients based on the difference between a value of the sensor data and the alert threshold.

The IoT gateway device 102 may determine in block 328 the mathematical model based on the comparison of past sensor data to alert thresholds. For example, if recent sensor data was past an alert threshold, the IoT gateway device 102 may determine that a relatively high quantity of coefficients with a relatively high precision should be used for a certain period of time.

After the IoT gateway device 102 determines the values of the coefficients of the mathematical model, the IoT gateway device 102 sends the values of the coefficients to a cloud compute device 106 in block 330. In some embodiments, the IoT gateway device 102 may send additional information related to the mathematical model to the cloud compute device 106, such as the type of the mathematical model, the number of coefficients, and the precision of the coefficients.

In block 332, the IoT gateway device 102 determines a sampling frequency for future sensor data based on the current sensor data. For example, if the sensor data is close to or past an alert threshold, the IoT gateway device 102 may determine that a high frequency should be used for sampling the sensor. In embodiments wherein the sensor 104 transmits the sensor data to the IoT gateway device 102, the IoT gateway device 102 may instruct the sensor 104 to sample and/or transmit the data at the determined frequency.

EXAMPLES

Illustrative examples of the devices, systems, and methods disclosed herein are provided below. An embodiment of the devices, systems, and methods may include any one or more, and any combination of, the examples described below.

Example 1 includes an Internet of Things (IoT) gateway device for transmitting sensor data, the IoT gateway device comprising a sensor data capture module to receive, from a sensor, sensor data; a sensor data representation module to determine a mathematical model to represent the sensor data based on a trend of the sensor data, wherein to determine the mathematical model comprises to (i) determine a number, n, of coefficients to be used in the mathematical model and (ii) determine a value of a plurality of coefficients of the mathematical model; and a communication module to send the values of the plurality of coefficients to a cloud compute device.

Example 2 includes the subject matter of Example 1, and wherein to send the values of the plurality. of coefficients comprises to send n coefficients of the plurality of coefficients to the cloud compute device.

Example 3 includes the subject matter of any of Examples 1 and 2, and wherein to determine the mathematical model further comprises to determine, based on the trend of the sensor data, a precision of the plurality of coefficients.

Example 4 includes the subject matter of any of Examples 1-3, and wherein to determine the mathematical model further comprises to determine, based on the trend, a type of the mathematical model.

Example 5 includes the subject matter of any of Examples 1-4, and wherein the type of the mathematical model is a polynomial fit.

Example 6 includes the subject matter of any of Examples 1-5, and wherein the type of the mathematical model is a fit to a plurality of frequencies.

Example 7 includes the subject matter of any of Examples 1-6, and wherein the sensor data representation module is further to determine, based on the sensor data, a future sampling frequency associated with the sensor.

Example 8 includes the subject matter of any of Examples 1-7, and wherein the communication module is further to instruct the sensor to send future sensor data sampled at a frequency based on the future sampling frequency.

Example 9 includes the subject matter of any of Examples 1-8, and wherein the trend of the sensor data consists of a historical trend.

Example 10 includes the subject matter of any of Examples 1-9, and wherein to determine the mathematical model comprises to determine a mathematical model further based on one or more parameters of a past mathematical model.

Example 11 includes the subject matter of any of Examples 1-10, and wherein to determine the mathematical model comprises to determine the mathematical model further based on a sampling frequency associated with the sensor data.

Example 12 includes the subject matter of any of Examples 1-11, and wherein to determine the mathematical model comprises to determine the mathematical model based on a comparison performed by the IoT gateway device of the sensor data to an alert threshold.

Example 13 includes the subject matter of any of Examples 1-12, and wherein the sensor data representation module is further to perform the comparison performed by the IoT gateway device of the sensor data to the alert threshold by determining a difference between a value of the sensor data and the alert threshold.

Example 14 includes the subject matter of any of Examples 1-13, and wherein to determine the mathematical model comprises to determine the mathematical model based on the difference between the value of the sensor data and the alert threshold.

Example 15 includes the subject matter of any of Examples 1-14, and wherein to determine the mathematical model comprises to determine the mathematical model based on a comparison performed by the IoT gateway device of past sensor data to an alert threshold.

Example 16 includes a method for transmitting sensor data by an Internet of Things (IoT) gateway device, the method comprising receiving, by the IoT gateway device and from a sensor, sensor data; determining, by the IoT gateway device, a mathematical model to represent the sensor data based on a trend of the sensor data, wherein determining the mathematical model comprises (i) determining a number, n, of coefficients to be used in the mathematical model and (ii) determining a value of a plurality of coefficients of the mathematical model; and sending, by the IoT gateway device, the values of the plurality of coefficients to a cloud compute device.

Example 17 includes the subject matter of Example 16, and wherein sending the values of the plurality of coefficients comprises sending n coefficients of the plurality of coefficients to the cloud compute device.

Example 18 includes the subject matter of any of Examples 16 and 17, and wherein determining the mathematical model further comprises determining, based on the trend of the sensor data, a precision of the plurality of coefficients.

Example 19 includes the subject matter of any of Examples 16-18, and wherein determining the mathematical model further comprises determining, based on the trend, a type of the mathematical model.

Example 20 includes the subject matter of any of Examples 16-19, and wherein the type of the mathematical model is a polynomial fit.

Example 21 includes the subject matter of any of Examples 16-20, and wherein the type of the mathematical model is a fit to a plurality of frequencies.

Example 22 includes the subject matter of any of Examples 16-21, and further including determining, by the IoT gateway device and based on the sensor data, a future sampling frequency associated with the sensor.

Example 23 includes the subject matter of any of Examples 16-22, and further including instructing, by the IoT gateway device, the sensor to send future sensor data sampled at a frequency based on the future sampling frequency.

Example 24 includes the subject matter of any of Examples 16-23, and wherein the trend of the sensor data consists of a historical trend.

Example 25 includes the subject matter of any of Examples 16-24, and wherein determining the mathematical model comprises determining the mathematical model further based on one or more parameters of a past mathematical model.

Example 26 includes the subject matter of any of Examples 16-25, and wherein determining the mathematical model comprises determining the mathematical model based on a sampling frequency associated with the sensor data.

Example 27 includes the subject matter of any of Examples 16-26, and wherein determining the mathematical model comprises determining the mathematical model based on a comparison performed by the IoT gateway device of the sensor data to an alert threshold.

Example 28 includes the subject matter of any of Examples 16-27, and further including performing, by the IoT gateway device, the comparison performed by the IoT gateway device of the sensor data to the alert threshold by determining a difference between a value of the sensor data and the alert threshold.

Example 29 includes the subject matter of any of Examples 16-28, and wherein determining the mathematical model comprises determining the mathematical model based on the difference between the value of the sensor data and the alert threshold.

Example 30 includes the subject matter of any of Examples 16-29, and wherein determining the mathematical model comprises determining the mathematical model based on a comparison performed by the IoT gateway device of past sensor data to an alert threshold.

Example 31 includes an or more machine-readable storage media comprising a plurality of instructions stored thereon that in response to being executed result in a computing device performing the method of any of Examples 16-30.

Example 32 includes an Internet of Things (IoT) gateway device for transmitting sensor data, the IoT gateway device comprising means for receiving, from a sensor, sensor data; means for determining a mathematical model to represent the sensor data based on a trend of the sensor data, wherein determining the mathematical model comprises (i) determining a number, n, of coefficients to be used in the mathematical model and (ii) determining a value of a plurality of coefficients of the mathematical model; and means for sending the values of the plurality of coefficients to a cloud compute device.

Example 33 includes the subject matter of Example 32, and wherein the means for sending the values of the plurality of coefficients comprises means for sending n coefficients of the plurality of coefficients to the cloud compute device.

Example 34 includes the subject matter of any of Examples 32 and 33, and wherein the means for determining the mathematical model further comprises means for determining, based on the trend of the sensor data, a precision of the plurality of coefficients.

Example 35 includes the subject matter of any of Examples 32-34, and wherein the means for determining the mathematical model further comprises means for determining, based on the trend, a type of the mathematical model.

Example 36 includes the subject matter of any of Examples 32-35, and wherein the type of the mathematical model is a polynomial fit.

Example 37 includes the subject matter of any of Examples 32-36, and wherein the type of the mathematical model is a fit to a plurality of frequencies.

Example 38 includes the subject matter of any of Examples 32-37, and further including means for determining, based on the sensor data, a future sampling frequency associated with the sensor.

Example 39 includes the subject matter of any of Examples 32-38, and further including means for instructing the sensor to send future sensor data sampled at a frequency based on the future sampling frequency.

Example 40 includes the subject matter of any of Examples 32-39, and wherein the trend of the sensor data consists of a historical trend.

Example 41 includes the subject matter of any of Examples 32-40, and wherein the means for determining the mathematical model comprises means for determining the mathematical model further based on one or more parameters of a past mathematical model.

Example 42 includes the subject matter of any of Examples 32-41, and wherein the means for determining the mathematical model comprises means for determining the mathematical model based on a sampling frequency associated with the sensor data.

Example 43 includes the subject matter of any of Examples 32-42, and wherein the means for determining the mathematical model comprises means for determining the mathematical model based on a comparison performed by the IoT gateway device of the sensor data to an alert threshold.

Example 44 includes the subject matter of any of Examples 32-43, and further including means for performing the comparison performed by the IoT gateway device of the sensor data to the alert threshold by determining a difference between a value of the sensor data and the alert threshold.

Example 45 includes the subject matter of any of Examples 32-44, and wherein the means for determining the mathematical model comprises means for determining the mathematical model based on the difference between the value of the sensor data and the alert threshold.

Example 46 includes the subject matter of any of Examples 32-45, and wherein the means for determining the mathematical model comprises means for determining the mathematical model based on a comparison performed by the IoT gateway device of past sensor data to an alert threshold.

The invention claimed is:

1. An Internet of Things (IoT) gateway device for transmitting sensor data, the IoT gateway device comprising:
    sensor data capture circuitry to obtain, from a sensor, first sensor data;
    sensor data representation circuitry to:
        analyze the first sensor data to determine a first trend of the first sensor data;
        determine a first quantity ($n_1$) of coefficients to be used in a mathematical model to represent the first trend of the first sensor data; and
        determine values of a first plurality of coefficients of the mathematical model based on the first sensor data; and
    communication circuitry to send the values of the first plurality of coefficients to a cloud compute device at a first bandwidth proportional to the first quantity ($n_1$) of coefficients used in the mathematical model, the sensor data capture circuitry to obtain second sensor data;
    the sensor data representation circuitry to:
        analyze the second sensor data to determine a second trend of the second sensor data;
        determine a second quantity ($n_2$) of coefficients to be used in an updated mathematical model to represent the second trend of the second sensor data, the second quantity ($n_2$) of coefficients determined based on a determination that the first sensor data has passed an alert threshold; and
        determine values of a second plurality of coefficients of the updated mathematical model based on the second sensor data, the communication circuitry to send the values of the second plurality of coefficients to the cloud compute device at a second bandwidth proportional to the second quantity ($n_2$) of coefficients used in the updated mathematical model.

2. The IoT gateway device of claim 1, wherein to send the values of the first plurality of coefficients comprises to send the values of the first quantity ($n_1$) coefficients of the first plurality of coefficients to the cloud compute device.

3. The IoT gateway device of claim 1, wherein the sensor data representation circuitry includes mathematical model determination circuitry to determine, based on the first trend of the first sensor data, a precision of the first plurality of coefficients.

4. The IoT gateway device of claim 1, wherein the sensor data representation circuitry includes mathematical model determination circuitry to determine, based on the first trend, a type of the mathematical model.

5. The IoT gateway device of claim 4, wherein the type of the mathematical model is a polynomial fit.

6. The IoT gateway device of claim 1, wherein the sensor data representation circuitry is further to determine, based on the first sensor data, a sampling frequency associated with the sensor.

7. The IoT gateway device of claim 1, wherein the sensor data representation circuitry includes mathematical model determination circuitry to determine the mathematical model based on a comparison performed by the IoT gateway device between the first sensor data and the alert threshold.

8. The IoT gateway device of claim 1, wherein the sensor data representation circuitry includes mathematical model determination circuitry to determine the mathematical model based on a comparison performed by the IoT gateway device between past sensor data and the alert threshold.

9. The IoT gateway device of claim 1, wherein the first sensor data is at least 100 data points,
    wherein to determine the values of the first plurality of coefficients of the mathematical model comprises to determine the values of the first plurality of coefficients of the mathematical model based on the at least 100 data points.

10. The IoT gateway device of claim 9, wherein to determine the values of the first plurality of coefficients of the mathematical model comprises to determine a quadratic term of the mathematical model based on the at least 100 data points.

11. One or more non-transitory computer-readable media comprising a plurality of instructions stored thereon that, when executed by one or more processors of an Internet of Things (IoT) gateway device, cause the IoT gateway device to at least:

analyze first sensor data to determine a first trend of the
first sensor data;
determine a first quantity ($n_1$) of coefficients to be used in
a mathematical model to represent the first trend of the
first sensor data; and
determine values of a first plurality of coefficients of the
mathematical model based on the first sensor data;
send the values of the first plurality of coefficients to a
cloud compute device at a first bandwidth proportional
to the first quantity ($n_1$) of coefficients used in the
mathematical model;
analyze second sensor data to determine a second trend of
the second sensor data;
determine a second quantity ($n_2$) of coefficients to be used
in an updated mathematical model to represent the
second trend of the second sensor data, the second
quantity ($n_2$) of coefficients determined based on a
determination that the first sensor data has passed an
alert threshold; and
determine values of a second plurality of coefficients of
the updated mathematical model based on the second
sensor data; and
send the values of the second plurality of coefficients to
the cloud compute device at a second bandwidth proportional to the second quantity ($n_2$) of coefficients
used in the updated mathematical model.

12. The one or more non-transitory computer-readable media of claim 11, wherein to send the values of the first plurality of coefficients comprises to send the values of the first quantity ($n_1$) of coefficients of the first plurality of coefficients to the cloud compute device.

13. The one or more non-transitory computer-readable media of claim 11, wherein the plurality of instructions further cause the IoT gateway device to determine, based on the first trend, a type of the mathematical model.

14. The one or more non-transitory computer-readable media of claim 11, wherein the plurality of instructions further cause the IoT gateway device to determine, based on the first sensor data, a future sampling frequency associated with a sensor from which the first sensor data is obtained.

15. The one or more non-transitory computer-readable media of claim 11, wherein the plurality of instructions further cause the IoT gateway device to determine the mathematical model based on a comparison performed by the IoT gateway device between the first sensor data and the alert threshold.

16. The one or more non-transitory computer-readable media of claim 11, wherein the plurality of instructions further cause the IoT gateway device to determine the mathematical model based on a comparison performed by the IoT gateway device between past sensor data and the alert threshold.

17. A method for transmitting sensor data by an Internet of Things (IoT) gateway device, the method comprising:
analyzing, by the IoT gateway device, first sensor data to
determine a first trend of the first sensor data;
determining a first quantity ($n_1$) of coefficients to be used
in a mathematical model to represent the first trend of
the first sensor data;
determining values of a first plurality of coefficients of the
mathematical model based on the first sensor data;
sending, by the IoT gateway device, the values of the first
plurality of coefficients to a cloud compute device at a
first bandwidth proportional to the first quantity ($n_1$) of
coefficients used in the mathematical model;
analyzing, by the IoT gateway device, second sensor data
to determine a second trend of the second sensor data;
determining, by the IoT gateway device, a second quantity ($n_2$) of coefficients to be used in an updated
mathematical model to represent the second trend of
the second sensor data, the second quantity ($n_2$) of
coefficients determined based on a determination that
the first sensor data has passed an alert threshold;
determining values of a second plurality of coefficients of
the updated mathematical model based on the second
sensor data; and
sending, by the IoT gateway device, the values of the
second plurality of coefficients to the cloud compute
device at a second bandwidth proportional to the second quantity ($n_2$) of coefficients used in the updated
mathematical model.

18. The method of claim 17, wherein sending the values of the first plurality of coefficients comprises sending the values of the first quantity ($n_1$) of coefficients of the first plurality of coefficients to the cloud compute device.

19. The method of claim 17, further comprising determining, based on the first trend, a type of the mathematical model.

20. The method of claim 17, further comprising determining, by the IoT gateway device and based on the first sensor data, a sampling frequency associated with a sensor from which the first sensor data is obtained.

21. The method of claim 20, further comprising instructing, by the IoT gateway device, the sensor to send future sensor data sampled at a frequency based on the sampling frequency.

22. The method of claim 17, further comprising determining the mathematical model based on a comparison performed by the IoT gateway device between the first sensor data and the alert threshold.

23. The method of claim 17, further comprising determining the mathematical model based on a comparison performed by the IoT gateway device between past sensor data and the alert threshold.

24. An apparatus comprising:
memory;
instructions in the memory; and
processor circuitry communicatively coupled to the
memory, the processor circuitry to be programmed by
the instructions to:
analyze first sensor data to determine a first trend of the
first sensor data;
determine a first quantity ($n_1$) of coefficients to be used
in a mathematical model to represent the first trend
of the first sensor data;
determine values of a first plurality of coefficients of the
mathematical model based on the first sensor data;
send the values of the first plurality of coefficients to a
cloud compute device at a first bandwidth proportional to the first quantity ($n_1$) of coefficients used in
the mathematical model;
analyze second sensor data to determine a second trend
of the second sensor data;
determine a second quantity ($n_2$) of coefficients to be
used in an updated mathematical model to represent
the second trend of the second sensor data, the
second quantity ($n_2$) of coefficients determined based
on a determination that the first sensor data has
passed an alert threshold;
determine values of a second plurality of coefficients of
the updated mathematical model based on the second
sensor data; and
send the values of the second plurality of coefficients to
the cloud compute device at a second bandwidth proportional to the second quantity ($n_2$) of coefficients used in the updated mathematical model.

25. The apparatus of claim 24, wherein the processor circuitry is to send the values of the first plurality of coefficients by sending the values of the first quantity ($n_1$) of coefficients of the first plurality of coefficients to the cloud compute device.

26. The apparatus of claim 24, wherein the processor circuitry is to determine, based on the first trend, a type of the mathematical model.

* * * * *